United States Patent [19]

Blattner

[11] Patent Number: 4,701,281
[45] Date of Patent: Oct. 20, 1987

[54] PROCESS FOR THE PREPARATION OF ANTHRAQUINONE IMIDES

[75] Inventor: Rudolf Blattner, Rheinfelden, Fed. Rep. of Germany

[73] Assignee: Ciba-Geigy Corporation, Ardsley, N.Y.

[21] Appl. No.: 844,408

[22] Filed: Mar. 26, 1986

[30] Foreign Application Priority Data

Apr. 1, 1985 [CH] Switzerland ............... 1400/85

[51] Int. Cl.⁴ .............................................. C07C 97/24
[52] U.S. Cl. ................................... 260/367; 260/368
[58] Field of Search ............................... 260/367, 368

[56] References Cited

U.S. PATENT DOCUMENTS

| | | | |
|---|---|---|---|
| 814,137 | 3/1906 | Isler | 260/367 |
| 2,156,887 | 5/1939 | Weinand | 260/367 |
| 3,234,242 | 2/1966 | Jost et al. | 260/367 |
| 3,565,923 | 2/1971 | Grelat et al. | 260/367 |
| 3,720,678 | 3/1973 | Grelat | 260/367 |
| 4,382,034 | 5/1983 | Reubke et al. | 260/367 |

Primary Examiner—Glennon H. Hollrah
Assistant Examiner—Raymond Covington
Attorney, Agent, or Firm—Edward McC. Roberts; Kevin T. Mansfield

[57] ABSTRACT

In the preparation of anthraquinone imides by condensing a vattable anthraquinone compound which contains at least one primary amino group with an aromatic halogen compound, in an organic solvent and at elevated temperature, it is advantageous first to heat the organic solvent to the reaction temperature and then, at this temperature, to add the educts to the solvent.

9 Claims, No Drawings

PROCESS FOR THE PREPARATION OF ANTHRAQUINONE IMIDES

Many anthraquinone imides are prepared by condensing a vattable anthraquinone compound which contains at least one primary amino group with an aromatic halogen compound. The condensation is conveniently carried out at elevated temperature in an organic solvent and in the presence of a base and a copper compound. In such a process, the educts are usually added to the organic solvent and subsequently heated to the reaction temperature. However, this process has disadvantages. The resultant condensation products contain impurities and, in addition, relatively large amounts of organic solvent are required to make the reaction mixture readily stirrable.

It is the object of the present invention to provide a process which does not have or which reduces the aforementioned disadvantages.

This object is achieved by heating the educts, in the organic solvent, very rapidly to the reaction temperature. Surprisingly, purer products are obtained by this procedure and the yield is increased. Moreover, the reaction can be carried out in concentrated solutions without the reaction mixture becoming difficult to stir. In addition to the saving of solvent, a further advantage lies in the fact that the isolation of the dye is less complicated and, moreover, the amount of base and of copper compound can be reduced.

Accordingly, the present invention relates to a process for the preparation of anthraquinone imides by condensing vattable anthraquinone compounds which contain at least one primary amino group with aromatic halogen compounds, in an organic solvent and in the presence of a base and a copper catalyst, which process comprises heating the educts, in the organic solvent, very rapidly to the reaction temperature.

The reaction temperature is generally in the range from 140° to 250° C., preferably from 180° to 220° C., most preferably from 195° to 215° C.

The educts, namely the amino compound and the halogen compound, are heated, in the organic solvent, very rapidly to the reaction temperature, i.e. within less than 10 minutes, preferably within less than 1 minute, most preferably within not more than 10 seconds. To this end, a solution or suspension of the educts can be quickly brought to the reaction temperature by an appropriate step, e.g. by microwave heating or by passing the solution or suspension through a suitably well heated pipe. However, it is preferred first to heat the organic solvent to the reaction temperature and then, at this temperature, to add the educts to the solvent in such a manner that the reaction temperature can be maintained. The educts are added in the form of solid substances or, preferably, in the form of a suspension or solution in the same organic solvent. The copper catalyst and the base may be present in that portion of the organic solvent which has been heated to the reaction temperature or they can be added together with the educts.

Preferably, 5 to 30% by weight of these components (copper catalyst and base) are in the solvent which has been heated to the reaction temperature and the remainder is added together with the educts.

The vattable anthraquinone compounds containing at least one primary amino group may carry the customary substituents of vat dyes, e.g. halogen, alkyl, alkoxy or acylamines such as acetylamino and benzylamino and also fused benzene rings. Preferably, such compounds are aminoanthraquinones, e.g. 1-aminoanthraquinone, 1,4- and 1,5-diaminoanthraquinone, 1-amino-4-benzoylaminoanthraquinone, 1-amino-5-benzoylaminoanthraquinone or aminoviolanthrone. Mixtures of two or more of these compounds can also be employed.

Suitable aromatic halogen compounds are those in which the halogen atom is attached direct to the aromatic nucleus. Acid halides of aromatic compounds, or compounds which behave similarly to acid halides, e.g. cyanuric chloride, shall not be understood as being aromatic halogen compounds.

Particularly suitable aromatic halogen compounds of this type are halogenated anthraquinone, benzanthrone, anthanthrone, pyranthrone, dibenzanthrone, phthaloylacridone, flavanthrone, dibenzpyrenequinone or isoviolanthrone, which compounds may be further substituted by customary substituents of vat dyes.

Especially good results are obtained in the process of the present invention by using chlorinated or brominated anthraquinone, benzanthrone, anthanthrone, pyranthrone or dibenzanthrone, which compounds may be further substituted by benzoylamino.

The halogen compound and the vattable amino compound are generally employed in approximately stoichiometric amounts. However, an excess of e.g. 10% of one of the components is also possible.

Suitable organic solvents are inert solvents such as sulfolane, naphthaline or nitrotoluene and, in particular, nitrobenzene.

Suitable copper catalysts are metallic copper and copper compounds such as copper oxide or copper(I) chloride, with copper being preferred and copper(I) chloride being most preferred.

Suitable bases are e.g. sodium bicarbonate, potassium bicarbonate, sodium acetate, potassium acetate, sodium carbonate and potassium carbonate as well as mixtures of these compounds.

The amount of copper catalyst required in the process of this invention is less than the amount required for anthrimide synthesis by conventional methods. In general, 0.1 to 1% by weight of copper catalyst is required, based on the resultant anthrimide.

After the condensation reaction, the anthraquinone imides are isolated in conventional manner, e.g. by removing the solvent by steam distillation and then filtering off the condensation product and drying it.

The process can be carried out in conventional apparatus known to the skilled person.

Moreover, the reaction may be carried out in an apparatus which is suitable for the subsequent removal of the solvent, e.g. in a paddle dryer, mixer or kneader. Particularly suitable for this reaction are mixers with a built-in device for dispersing the reaction mass, e.g. Drais T reactors equipped with a cutting mill or pinned disc mill or Lodicke mixers of the same construction.

Compared with the known processes, an increase in yield is achieved with the process of the present invention; furthermore, products with improved qualities are obtained, for example greater purity and higher colour strength.

The anthraquinone imides obtained by the process of this invention are mostly intermediates. After conversion to carbazole or acridine derivatives they yield vat dyes which are used for dyeing and printing textile materials such as cotton.

The invention is illustrated by the following non-limitative Examples.

EXAMPLE 1

122 g of 99% 1-chloroanthraquinone, 60 g of 91% 1,4-diaminoanthraquinone, 50 g of sodium carbonate (soda) and 1.5 g of CuCl are mixed intensively at room temperature in 500 ml of nitrobenzene. Over 1½ hours, the resultant suspension is added to a boiling suspension of 50 ml of nitrobenzene, 10 g of soda and 0.5 g of CuCl in such a manner that the boiling temperature (210° to 215° C.; slight distillation) can be maintained continuously. After a reaction time of a further 2½ hours at this temperature, the reaction is complete and the reaction mass can be worked up in conventional manner (steam distillation, filtration and drying in vacuo in a stirred horizontal dryer). After drying, the filter cake may be suspended in water in order to remove the salts, subsequent to which the suspension is filtered.

Yield: 225 g of thianthrimide (salt-containing) or 170 g after salt removal and drying.

EXAMPLE 2

Following the procedure as descrilbed in Example 1, but suspending the 1-chloroanthraquinone, 1,4-diaminoanthraquinone, sodium carbonate and CuCl in 300 ml of nitrobenzene, the anthrimide is obtained in a yield corresponding to that of Example 1. When following a conventional procedure, i.e. mixing the components and heating them slowly, if such a concentrated reaction mixture is employed, the reaction can no longer be carried out in an agitator vessel.

EXAMPLE 3

A suspension of educts is prepared according to either of Examples 1 or 2, but using 60 g of soda and 2 g of copper(I) chloride. In a laboratory stirred horizontal dryer, this suspension is added direct to about 100 ml of boiling nitrobenzene, over 1½ hours. During the addition about 150 ml of nitrobenzene is distilled off. When the addition of the suspension of educts is complete, the jacket temperature is increased to 230° C. and held at this level for about a further 2 hours, during which time most of the nitrobenzene distills off. When the reaction is complete, the jacket temperature is decreased to 180° C. and, with cautious evacuation, the remainder of the nitrobenzene is removed. After the reaction mass has cooled, it is worked up as described in Example 1. The yield is the same as in either of Examples 1 or 2.

EXAMPLE 4 to 12

Following a procedure as described in Examples 1 to 3, but using instead of 1-chloroanthraquinone an equivalent amount of the halogen compound indicated in column 2 of the following Table and reacting this with the compound containing an amino group, indicated in column 3, in approximately the stoichiometric amount with respect to the halogen equivalents, there are obtained vat dyes or precursors thereof, which, if necessary after a suitable cyclisation reaction, dye cotton in the shade indicated in column 4.

TABLE

| Ex. | Halogen compound | Compound containing an amino group | Shade |
| --- | --- | --- | --- |
| 4 | 3,8-dibromobenzanthrone | 1-aminoanthraquinone | olive |
| 5 | 1-chloroanthraquinone | 1-aminoanthraquinone | olive |
| 6 | 3-bromobenzanthrone | 1-aminoanthraquinone | olive |
| 7 | 1,5-dichloroanthraquinone | 1-aminoanthraquinone | yellow |
| 8 | 1-chloroanthraquinone + 1,5-dichloroanthraquinone | 1-aminoanthraquinone + 1,5-diaminoanthraquinone | yellowish brown |
| 9 | 1-benzoylamino-4-bromo-anthraquinone | 1-amino-5-benzoyl-aminoanthraquinone | brown |
| 10 | dibromoviolanthrone | 1-aminoanthraquinone | black |
| 11 | 1,4,5-trichloroanthraquinone | 1-aminoanthraquinone | khaki |
| 12 | 1-nitro-4,5-dichloro-anthraquinone | 1-aminoanthraquinone | reddish brown |

What is claimed is:

1. In a process for the preparation of an anthraquinone imide by condensing a vattable anthraquinone compound which contains at least one primary amino group with a halogenated anthraquinone, benzanthrone, anthanthrone, pyranthrone, dibenzanthrone, phthaloylacridone, flavanthrone, dibenzpyrenequinone or isoviolanthrone, which aromatic halogen compounds are unsubstituted or further substituted by halogen, alkyl, alkoxy, acylamino or fused benzene rings, in an non-aqueous inert organic solvent and in the presence of a base and a copper catalyst, the improvement of which comprises heating a portion of the inert organic solvent to the reaction temperature which is in the range of 140° to 250° C. and, at this temperature, adding the reactants in the form of a suspension or solution in such a manner that the reaction temperature can be maintained, the reactants thereby being heated to the reaction temperature within less than 10 minutes, and holding at the reaction temperature until the condensation reaction is complete.

2. A process according to claim 1, which comprises heating the reactants in the organic solvent, to the reaction temperature within less than 1 minute.

3. A process according to claim 2, which comprises heating the reactants, in the organic solvent, to the reaction temperature within less than 10 seconds.

4. A process according to claim 1, wherein the reaction temperature is in the range from 180° to 220 ° C.

5. A process according to claim 4, wherein the reaction temperature is in the range from 195° to 215° C.

6. A process according to claim 1, which comprises adding 5 to 30% by weight of the base and the copper catalyst to the solvent, which has been heated to the reaction temperature, and adding the remainder together with the reactants.

7. A process according to claim 1, wherein the vattable anthraquinone compound which contains at least one primary amino group is selected from 1-aminoanthraquinone, 1,4-diaminoanthraquinone, 1,5-diaminoanthraquinone, 1-amino-4-benzoylaminoanthraquinone, 1-amino-5-benzoylamino-anthraquinone or aminoviolanthrone.

8. A process according to claim 1, wherein the aromatic halogen compound is selected from chlorinated or brominated anthraquinone, benzanthrone, anthanthrone, pyranthrone or dibenzanthrone.

9. A process according to claim 1, wherein the copper catalyst is copper or copper(I) chloride.

* * * * *